Jan. 30, 1968  A. ARIAS  3,365,930
THERMAL SHOCK APPARATUS
Filed Dec. 29, 1964
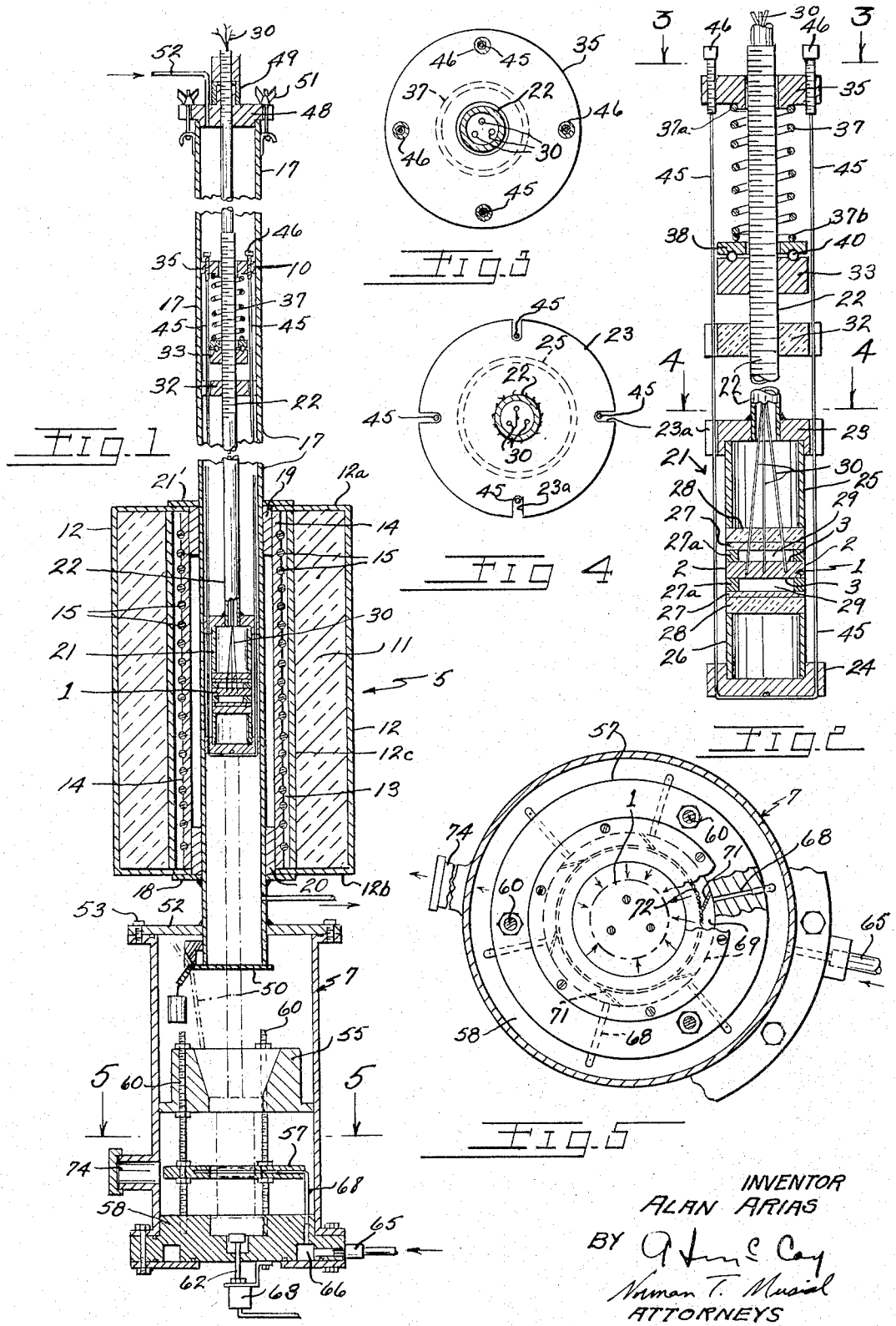
INVENTOR
ALAN ARIAS
BY
Norman T. Musial
ATTORNEYS

United States Patent Office 3,365,930
Patented Jan. 30, 1968

3,365,930
THERMAL SHOCK APPARATUS
Alan Arias, Cleveland, Ohio, assignor to the United States of America as represented by the Administrator of the National Aeronautics and Space Administration
Filed Dec. 29, 1964, Ser. No. 422,099
6 Claims. (Cl. 73—15)

ABSTRACT OF THE DISCLOSURE

An elongated, cylindrical heating chamber disposed above a quenching chamber in which there is disposed nozzle means for spraying cooling fluid radially inward in a cooling zone. A sample disc to be tested is sandwiched between insulating discs and end plates, one of which is attached to a threaded tubular supporting means releasably supported by the furnace.

A top tension plate which may be adjusted axially is carried on the threaded tube and wires are looped under the other of said end plates to form a carrier, the ends of the wires being fastened to the top tension plates. A spring urges the top tension plate away from the carrier to tighten the looped wires.

When the supporting means is released, the carrier drops into the quenching chamber so that the disc is positioned in the cooling zone. The nozzle means sprays cooling fluid on the periphery of the disc.

---

The invention described herein was made by an employee of the United States Government and may be manufactured and used by or for the Government for Governmental purposes without the payment of any royalties thereon or therefor.

This invention relates to apparatus for measuring the thermal shock resistance of thin discs of material samples by heating and insulating the faces of the discs and thereafter cooling the peripheries of the discs with a cooling fluid. The invention also relates to apparatus for and methods of quantitatively determining thermal-shock resistance properties of relatively brittle materials such as glass, beryllium oxide, aluminum oxide, and zirconium oxide or for determining the surface heat transfer coefficient of quenching media (both liquids and gases) or for estimating the thermal diffusivity and thermal conductivity of a disc of material.

It is an object of the present invention to provide apparatus for quantitatively determining the thermal-shock resistance of materials by heating and insulating the face of a disc made of a material such as glass, thereafter uniformly cooling the periphery thereof and measuring the temperatures of predetermined interior locations in said disc.

It is an object of the present invention to provide apparatus and methods for determining quantitatively the thermal-shock resistance of brittle materials by subjecting heated discs of said brittle materials to quenching fluids at their peripheries and measuring the temperature differences in said discs that cause a single-cycle failure or multiple-cycle failure.

It is an object of the present invention to provide apparatus for quantitatively determining the thermal-shock resistance of a brittle disc by heating said disc and cooling its periphery to measure the temperature difference between said periphery and the interior that causes a stress suficient to fracture the disc, the apparatus including a specimen carrier for the disc that includes means for aligning said disc properly during the heating and quenching thereof so that said periphery is uniformly heated and quenched.

These and other objects will become apparent from the specification that follows, the appended claims and the drawings in which:

FIGURE 1 is a fragmentary front elevational view of thermal-shock apparatus embodying the present invention, with parts broken away and shown in section;

FIGURE 2 is an enlarged sectional view of the specimen carrier for holding a disc for testing therewithin;

FIGURE 3 is a sectional view of the carrier shown in FIGURE 2 taken along the line 3—3 indicated in FIGURE 2;

FIGURE 4 is a sectional view taken along the line indicated at 4—4 in FIGURE 2; and FIGURE 5 is an enlarged view of the rotary air nozzle used for quenching the heated disc, the view being taken along the line indicated at 5—5 in FIGURE 1, with some parts broken away and shown in section.

It is to be understood that the invention here involved is not limited to the structural details or arrangements of parts shown in the preferred embodiment illustrated in the drawings inasmuch as the present invention may take various forms. Thus, the terminology herein employed is for the purpose of description and not illustration since the scope of the present invention is denoted by the appended claims.

The present invention provides an improved apparatus and method for quantitatively determining the thermal shock resistance of materials such as ceramics by quenching a ceramic disc (which has been previously heated to a uniform temperature throughout) in a medium (gas or liquid) of known quench severity. Quench severity is defined as the product of the surface heat transfer coefficient of the material under the given quenching conditions times the maximum radius of the disc (in this case). This thermal shock resistance $\Delta T$, is defined by the equation:

$$\Delta T = \frac{T_1 + T_2}{2} - T_f$$

where $T_1$ = maximum temperature specimen withstood without cracking;

$T_2$ = lowest temperature at which cracking is observed; and $T_f$ = uniform, final temperature of specimen (temperature of quenching medium).

For example, assume that a given disc is to be quenched in flowing helium at 30° C. When the disc is quenched from 275° C. it doesn't crack. The same disc is then reheated to 325° C. and quenched again and still doesn't crack. Again the disc is reheated to 375° C. and quenched. In this run the disc does crack. Then $$\Delta T = (325 + 375)/2 - 30 = 320° \text{ C.}$$

The determination of the heat transfer coefficient (which is a function of gas pressure, gas velocity, kind of gas, when a gas is used for cooling, or kind of liquid when a liquid is used for cooling) involves the determination of the cooling curves (i.e. the instantaneous temperature as a function of time) at one or more points in the disc. If the thermal conductivity and the thermal diffusivity of the disc material are known then only the cooling curve at one point in the specimen is required for the determination of the heat transfer coefficient. If the thermal conductivity and thermal diffusivity are not known, then the cooling curves at two points in the disc (at different distances from the center) are required for the determination of the heat transfer coefficient. It will be obvious that if the heat transfer coefficient is known (as determined by the second procedure above, for example) then the thermal diffusivity (and from this the thermal conductivity) can be determined.

In accordance with the present invention, means is provided for properly aligning the disc during the heating and/or quenching operations so that the disc is evenly heated and uniformly cooled throughout its periphery.

A thin disc 1 of a brittle material such as a ceramic (zirconia or tungsten carbide) can be used to determine its thermal-shock resistance properties, the disc 1 being uniformly heated throughout and thereafter its periphery uniformly quenched in the cooling step. The disc 1 has a pair of faces 3 that are heated during the heating operation and insulated during the quenching operation so that the temperature distribution during the cooling of the thin disc is the same as that in an infinite cylinder of the same material as the disc.

The apparatus used in the heating and quenching operation comprises a heating chamber 5, a quenching chamber 7, and a specimen carrier 10 for holding the disc 1 within the heating chamber and quenching chamber during the heating and quenching of said disc.

In the embodiment shown in the drawings, the heating chamber or furnace 5 comprises a generally tubular core 11 of insulating material that is encased within a metal jacket comprising an outer cylindrical wall 12, a top wall 12a, a bottom wall 12b and an inner wall 12c. The inner wall 12c defines a central elongated opening 13 within said tubular furnace, said opening being lined with a thin sleeve 14 around which is disposed a heating element 15 in the form of a helical wire coil.

A long, heat resistant tube 17 is provided around the periphery of the central cavity 13, the tube extending well above the top wall 12a of the heating chamber and below the bottom wall 12b. Said tube 17 is rigidly attached to a circular plate 18 that is supported by and is attached to the bottom furnace wall 12b. As seen in FIGURE 1, annular insulating and spacer members 19 and 20 space the tube 17 from the refractory heating element sleeve 14 at the top and bottom, respectively, of the furnace cavity 13 and minimize heat losses. The interior cavity 13 is thus lined with tube 17 and said interior is adapted to receive the specimen carrier 10 and disc 1 during the heating of said disc to equilibrium temperature. As seen in the drawings, the carrier 10 is enclosed within the tube 17 and the tube itself is tightly fitted and secured within the furnace cavity by the bottom support plate 18 as well as an upper plate 21' that is substantially smaller in diameter than top wall 12a.

As seen in FIGURE 1, an upper annular insulating spacer 19 and a lower annular insulating spacer 20 are provided between the outer surface of the wall of tube 17 and the heating element sleeve 14.

As to the construction of the specimen carrier 10, it is an elongated generally tubular device adapted to properly hold the test disc within the furnace and quenching chamber and adapted for easy transfer from the furnace into the quenching chamber. The preferred embodiment of the carrier shown in the drawings includes a disc-holding portion 21 near the lower end of the carrier and a relatively long hollow thermocouple tube 22 attached to the portion 21 and extending upwardly therefrom.

The disc-holding portion 21 comprises a top annular plate 23 welded to the bottom of the tube 22 and a bottom circular plate 24. The disc 1, as seen in FIGS. 1 and 2, is sandwiched between said top and bottom plates. A short upper tube 25 of Inconel is provided between the top plate 23 and the disc 1 and a short lower tube 26 of Inconel is provided between said disc 1 and the bottom plate 24. The disc 1 is spaced from said upper tube 25 and lower tube 26 by thermal insulating discs 27 preferably made of Fiberfrax insulating material and each disc 27 is backed by an annular fused silica disk 28 of the same outside diameter as the disc 1. A spacer ring 27a preferably made of Fiberfrax paper is provided in between each insulating disc 27 and the test disc 1, the ring 27a contacting said disc only in the area of its outer periphery and hence there is provided a dead air space 29 located radially inwardly from said ring and adjacent each face 3 of the disc 1.

As seen in FIGS. 1 and 2, three thermocouples 30 are provided to measure predetermined inner area portions of the disc 1, the thermocouples 30 being disposed within the hollow tube 22 on the upper portion of the carrier and extending downwardly from the bottom of tube 22 through the interior of Inconel tube 25 and passing through openings in the upper insulating disc 28 where the ends of the thermocouples terminate in the test disc 1 between said faces 3.

Above the disc-holding portion 21 of the carrier 10, there is provided an insulating disc 32, the tube 22 passing through the central opening thereof. Above said disc 32 and threadingly engaged on said tube 22 is a knurled nut 33. Spaced above said knurled nut 33 at the top of the specimen carrier 10 is top plate 35 that is slidingly mounted on the tube 22.

Located between the nut 33 and top plate 35 is a helical spring 37 that is disposed around the tube 22. The upper end 37a bears against the plate 35 and is centered therearound a stud portion that extends downwardly from the center of said plate 35.

As best seen in FIG. 2, spring 37 has a lower end 37b that terminates on a plate 38 that is the upper race of a ball bearing, the knurled nut 33 being the lower race for a plurality of balls 40.

A plurality of wires 45, preferably made of a strong, heat resistant material such as tungsten, are provided between the top plate 35 and the bottom disc 24 for properly aligning the disc 1 with said carrier 10. A plurality of adjusting screws 46 are provided at the upper end of each wire 45 on the plate 35 for adjusting the tension in the wires 45 so that each wire will have about the same tension during the testing operations.

As seen in the embodiment shown in the drawings, a single piece of wire 45 extends from the upper plate 35 to the bottom disc 24, the single length passing along a channel at the bottom of the disc 24 and up the opposite side of the disc and extending upwardly to return to the top plate 35 where both ends of the single piece of wire are fastened to adjusting screws 46. The carrier assembly is tightened by turning the knurled nut 33 to advance it upwardly on the threads of tube 22 which causes the spring 37 to bear against the plate 35 and push it upwardly along the tube 22. As noted in the drawings, the bottom plate 24 is rigidly held in the carrier with respect to the tube 22, but the upper tension plate 35 is slidingly mounted on the tube 22. The outside diameters of plates 35, 23 and 24 as well as shield 32 are of about the same size and said plates and shield contact the tube 17 but are slidable therewithin.

The tightening of the wires 45 rigidly connect bottom plate 24 to the tension plate 35. As seen in the drawings, the wires 45 pass through radial spaced peripheral slots 23a in the cap member 23 and peripheral slots in the radiation shield 32.

Holding means for holding the carrier 25 within the tube 17 while the disc 1 is being heated and equilibrium conditions are being established. Such holding means comprises a cover 48 and a tightening collar 49 that are provided near the top of tube 22, collar 49 being threadingly engaged on tube 22 and holding the carrier 10 and the tube 22 in the heating chamber of the furnace.

Fastening means such as wing nuts 51 are provided on the cover 49 to fasten the same down over the open end of tube 17 and a pipe 52 is provided through an opening in said cover for furnishing an inert gas into the Inconel tube 17 whereby the heating operation can be conducted in an inert atmosphere.

As previously indicated, when the disc 1 is heated to the equilibrium temperature desired, the carrier is removed from the furnace where the periphery 2 of disc 1 is uniformly quenched, the disc being held in proper alignment within the carrier by the aforedescribed aligning means that includes the tungsten wires 45.

In the preferred embodiment shown in the drawings, the heated disc and carrier 10 is dropped into the quenching chamber 7 by simply loosening the tightening collar 49 which releases the carrier from the heating chamber. The carrier drops into the quenching chamber 7 through the bottom of the tube 17 which extends downwardly a short distance into said chamber 7.

The carrier drops through a normally closed counter-weighted tray door 50 into a predetermined quenching position within the chamber 7, the quenching position of the carrier being shown in dot-dash lines in FIG. 1. The open position of the trap-door 50 also is shown in dot-dash lines in FIG. 1.

As seen in FIG. 1, the quenching chamber 7 includes a top cover 52 that is removably secured to the main chamber body by suitable fastening means such as bolts 53. The quenching chamber 7 also includes a guide member 55 with a central opening for holding the carrier 10 in a central quenching position that is within the chamber 7 and positioned generally vertically along the longitudinal axis of said chamber. A radial nozzle 57 is provided below the guide member 55 effective to uniformly quench the periphery 2 of the heated disc 1.

As seen in FIGS. 1 and 5, the quenching chamber 7 includes a circular base member 58 having a central round opening formed therein effective to receive the round bottom plate 24 of the carrier 10. As noted in FIG. 1 and in FIG. 5, three threaded posts 60 extend upwardly from the base member 58 and support the guide member 55 and allow adjusting the position of radial nozzle 57 within the quenching chamber. A central round opening in base 58 and guide 55 axially align the carrier 21 in the quenching position. The nozzle 57 is aligned horizontally with the disc 1.

As seen in FIG. 1, when the carrier 10 settles in the predetermined position within the quenching chamber, the bottom plate member 24 of the said carrier contacts a contact post 62 and depresses the same to activate a microswitch 63 which begins the operation of a suitable temperature recorder not shown.

If desired, of course, the temperature recorders can be started before the carrier and disc reach the quenching chamber.

The aforesaid contacting of the microswitch 63 also preferably starts the flow of a quenching gas through inlet pipe 65 into a manifold 66 cut into the base. A plurality of tubes 68, preferably six as shown in FIG. 5, extend upwardly from the manifold 66 and distribute the quenching fluid to the radial nozzle. The gas is distributed around the periphery of the disc 1 to uniformly quench the same by a nozzle manifold 69, there being a vane 71 for baffling the flow of the quenching gas from each tube as well as a wire screen 72 for diffusing the flow of gas out of the nozzle. The gas, after being uniformly distributed around the periphery of the test disc, leaves the quenching chamber 7 through an exit port 74.

Although the disc 1 and carrier 2 can be quenched in any suitable quenching fluid including a liquid such as water by removing quenching chamber 7, the quenching chamber 7 is especially adapted for use with the heating chamber 5 and carrier 10. Likewise, the preferred quenching fluid is an inert gas such as argon.

The proper alignment of the test disc 1 in the carrier 10 in the heating chamber and the quenching chamber and the ease of transferring the carrier from the heating chamber to the quenching chamber in an enclosed system provides an accurate reliable means of quantitatively measuring thermal shock properties of materials as well as of determining the heat transfer coefficient of cooling fluids.

It is seen that the heating chamber 5 provides at least one heating zone of uniform temperatures therewithin and that the aligning means is effective to position the disc in the one uniform heating zone. The chamber 5 preferably has a heating zone of uniform temperature in at least about the middle third of the cavity 13 whereby most of the length of the disc-holding portion 21 of the carrier is within said uniform heating zone. Likewise, the quenching chamber 7 preferably provides at least one cooling zone of uniform temperature, the aligning means again being effective to position the disc within the uniform zone which preferably includes the area of the radial nozzle whereby the disc is cooled evenly along its periphery.

It is understood that, in accordance with the provisions of the patent statutes, variations and modifications of the specific invention herein described may be made without changing the spirit thereof.

What is claimed is:

1. An apparatus for determining thermal shock properties of a plate-like material sample comprising a specimen carrier for holding said sample, an elongated heating chamber for receiving said carrier, means for heating said chamber effective to provide at least one heating zone of uniform temperature therein to heat the sample uniformly, means for supporting said carrier in said chamber, means on said carrier for aligning said carrier in said chamber effective to position said sample in said one heating zone, a quenching chamber having cooling means defining at least one cooling zone, said quenching chamber being disposed adjacent said heating chamber and positioned to receive said carrier from said heating chamber, said aligning means being operable in said quenching chamber to position said sample in said one cooling zone, said cooling means including inwardly directed nozzle means disposed around the inside of said quenching chamber in said cooling zone, said nozzle means being connected to a source of quenching fluid whereby quenching fluid is directed onto the edge of the material sample when the carrier is received in the quenching chamber causing the edge of the disc to be cooled abruptly.

2. An apparatus for determining thermal shock properties of a disc of a material sample comprising an elongated specimen carrier for holding said disc, an elongated generally tubular heating chamber for receiving said carrier, means for heating said chamber effective to provide at least one heating zone of uniform temperature therein whereby the disc is uniformly heated, means for supporting said carrier in said chamber and means on said carrier for aligning said carrier in said chamber effective to dispose said disc in said one heating zone in a position generally perpendicular to the longitudinal axis of the heating chamber, said disc being sandwiched between insulating means, a quenching chamber having cooling means defining at least one cooling zone of uniform temperature, said quenching chamber being disposed adjacent said heating chamber and positioned to receive said carrier from said heating chamber, said aligning means being operable in said quenching chamber to position said disc in said one cooling zone, said cooling means comprising a radial nozzle disposed in said cooling zone of said quenching chamber in a plane perpendicular to the longitudinal axis of said tubular heating chamber, said nozzle comprising a tubular ring having a continuous circumferential slot around its inner surface, and a plurality of conduits connected between a source of quenching fluid and equally spaced positions on said nozzle whereby quenching fluid is uniformly directed radially inwardly onto the edge of said disc when the carrier is received in the quenching chamber to cool the periphery of said disc, said insulating means maintaining the portion of said disc inward of its periphery at said uniform temperature.

3. An apparatus for determining thermal shock properties of a sample material disc, the apparatus comprising an elongated specimen carrier for holding the disc for measuring the thermal shock properties thereof; said carrier comprising first and second insulating rings disposed on opposite sides of said disc, first and second insulating plates disposed adjacent to said first and second insulating rings, respectively, to form an air space on each side of said disc, first and second tubular members disposed adjacent to said first and second insulating plates, respectively, and an upper and a lower carrier end plate disposed adjacent to said first and second tubular members, respectively, each end plate having a plurality of equally spaced apertures positioned adjacent to the edge thereof, said upper carrier end plate being attached to said supporting means; an elongated generally tubular hollow heating chamber adapted to heat said carrier and disc, said heating chamber having an elongated cylinder cavity in the interior thereof running substantially the length of the chamber for receiving said specimen carrier, means for heating said chamber effective to provide at least one heating zone of uniform temperature therewithin, supporting means for supporting said carrier in the cavity in a position generally parallel to the longitudinal axis of the chamber, release means for quickly removing said carrier from the heating chamber for quenching said disc, aligning means for aligning said disc in said carrier whereby said disc is generally perpendicular to the longitudinal axis of the carrier and located in said one heating zone, said aligning means including a top tension plate mounted on said supporting means and a plurality of wires disposed generally parallel to the longitudinal axis of the carrier, the ends of each of the wires being attached to the top tension plate, each wire forming a loop passing under the lower carrier end plate and through respective ones of said apertures in said upper and lower carrier end plates, said top tension plate being adjustable, tightening means for tightening said wires by adjusting the top plate in a direction away from the carrier to thereby clamp said disc in said carrier between said insulating rings and thereby align and hold the disc in said one heating zone, a quenching chamber connected below said heating chamber for receiving the heated carrier and disc, and means for positioning said carrier centrally within the quenching chamber in a position generally parallel to the longitudinal axis of the heating chamber, cooling means including nozzle means disposed in said quenching chamber and a source of cooling fluid connected to said nozzle means to supply cooling fluid thereto, said nozzle means being positioned to be adjacent to the periphery of said disc when said carrier is positioned centrally in said quenching chamber whereby the periphery of the disc is uniformly cooled.

4. An apparatus as defined in claim 3 in which the supporting means includes a hollow generally cylindrical shell that is disposed around the periphery of the heating chamber cavity, the shell having an extending top portion which extends beyond the top of the cavity, a cover that fits over said extending top portion, the cover having a central opening, said carrier including in its upper portion a hollow thermocouple tube that extends through said central opening of the cover down through the heating chamber cavity into the interior of the carrier, the tube being rigidly attached at its lower end to a lower disc-holding portion of the carrier, the tube having threads at the top thereof and collar means in threaded engagement with the tube to secure the thermocouple tube to said cover and to thereby support said tube and said carrier in the heating chamber cavity.

5. An apparatus as defined in claim 3 in which said supporting means includes a threaded tube on the upper carrier end plate disposed along the longitudinal axis of the heating chamber, said top tension plate being slidingly mounted on said tube, said tightening means including a nut threadingly engaged on said tube and a spring disposed between said nut and said top tension plate, said nut being movable on said tube and being effective to bear against said spring which pushes against said tension plate to move said plate along the tube to thereby take up slack in the wires and tighten the same.

6. An apparatus as defined in claim 5 in which said wires are made of tungsten and tension adjusting means is provided at the top of each wire where said wire is connected to said top tension plate whereby the tension in each wire can be equalized.

References Cited

UNITED STATES PATENTS

| 2,142,802 | 1/1939 | Riepert | 73—16 |
| 2,167,185 | 7/1939 | Preston | 73—15 |
| 2,730,894 | 1/1956 | Husa | 73—15 |
| 2,764,015 | 9/1956 | Menoher | 73—15 |

FOREIGN PATENTS

| 227,139 | 1/1925 | Great Britain. |

JAMES GILL, *Primary Examiner.*